US006690558B1

(12) United States Patent
Devoe et al.

(10) Patent No.: US 6,690,558 B1
(45) Date of Patent: Feb. 10, 2004

(54) POWER RESISTOR AND METHOD FOR MAKING

(76) Inventors: Alan Devoe, 5715 Waverly Ave., La Jolla, CA (US) 92037; Daniel Devoe, 1106 Barcelona, San Diego, CA (US) 92107

( * ) Notice: Subject to any disclaimer, the term of this patent is extended or adjusted under 35 U.S.C. 154(b) by 145 days.

(21) Appl. No.: 10/047,588

(22) Filed: Jan. 14, 2002

(51) Int. Cl.[7] .................................................. H02H 9/00

(52) U.S. Cl. ................... 361/58; 361/306.1; 361/306.3; 361/311; 361/313; 338/308; 338/309

(58) Field of Search ....................... 361/58, 328, 306.1, 361/306.3, 330, 321.1, 321.2, 321, 311–313, 104; 338/309, 308, 332; 257/536, 724

(56) References Cited

U.S. PATENT DOCUMENTS 5,495,387 A 2/1996 Mandai et al. .............. 361/328
5,815,065 A * 9/1998 Hanamura
5,841,183 A * 11/1998 Ariyoshi
5,889,445 A 3/1999 Ritter et al. ................ 333/172
5,907,274 A * 5/1999 Kimura et al.
6,078,250 A * 6/2000 Ueda et al.

OTHER PUBLICATIONS

John Haystead, *The Big Squeeze,* Electronic Business, EBT 6/97: Special Report: Passives (8 pp.).

* cited by examiner

*Primary Examiner*—Dean A. Reichard
*Assistant Examiner*—Nguyen T. Ha
(74) *Attorney, Agent, or Firm*—Wood, Herron & Evans, LLP

(57) ABSTRACT

A high power resistor device and method for making a high power resistor device. A resistor is formed on a first end of a fired, ceramic chip with multiple internal conductor electrodes, and end terminations are then applied to both ends of the chip. A power resistor device having a high power rating is thus provided having buried conductor electrodes electrically connected to end terminations, where the connection at the first end is through the resistor to form a power resistor structured to dissipate heat efficiently. In an alternative method of the present invention, both ends of the chip may be dipped in resistor paste to form resistors on both ends of the chip. In yet another alternative method of the present invention, a conductor under-layer is formed under the resistor, such as by first dipping the end of the chip in a conductor paste and firing the chip.

44 Claims, 3 Drawing Sheets

POWER RESISTOR AND METHOD FOR MAKING

FIELD OF THE INVENTION

This invention relates to resistor devices with a high power rating and the method for manufacturing these devices.

BACKGROUND OF THE INVENTION

In microelectronic assemblies, one goal is to achieve higher density circuit boards. To achieve this higher density, there is a need to reduce the size of each component. Traditionally, resistors are located near the surface of the circuit board, as depicted in FIG. 1. FIGS. 1A and 1B depict a conventional resistor device 10 of the prior art having an alumina body 12 and end terminations 14. The resistor is formed on a top surface 18 of the alumina body 12 and is in contact with end terminations 14 to form the resistor circuit. A power resistor is a resistor structured to dissipate heat. Typically, a power resistor has a resistance that is low enough to generate a significant amount of heat which can then be dissipated, for example, a resistance of 10 ohms or less. The power rating of a resistor is based on its ability to dissipate the heat generated. However, the conventional resistor device 10 must radiate heat into the air, or through the alumina body 12, neither of which is very efficient, resulting in a low power rating. Typically, to obtain a higher power rating in a conventional resistor device 10 requires a larger size device. Thus, there is a conflicting need for larger resistor devices to obtain higher power ratings and smaller resistor devices to achieve higher density circuit boards.

There is also a need to reduce part counts on the boards in order to reduce manufacturing assembly time and to reduce the number of interconnects, which can improve yields. Components referred to as "integrated passive components" or "integrated passives" can be used to address that need. One method for producing these components is referred to as the "Low Temperature Co-fired Ceramic" approach, or the so-called LTCC method. The LTCC method is an outgrowth of traditional thick film ceramics, where materials are fired at around 850° C. for about 10 minutes. None of the actual core materials are capable of sintering at these temperatures, but in the process they are mixed with a glass frit, which allows them to densify into a composite matrix having the desired properties of conductors, resistors or insulators. The goal of the LTCC approach is to take the materials traditionally used for making ceramic circuit boards, and instead use them to make complex sub-assemblies.

There is thus a need for a power resistor device of small dimension and high power rating that utilizes the benefits of the LTCC approach.

SUMMARY OF THE INVENTION

The present invention provides a power resistor device having a high power rating. To this end, the device comprises a fired ceramic chip, such as an alumina body, having internal continuous conductor electrodes or conductor plates. A resistor is formed on one or both ends of the chip, and the ends are terminated over the resistors. Because the resistor is covered with metal, which is then soldered to traces on the circuit board, better heat dissipation is achieved as compared to conventional resistors.

The present invention further provides a method for making power resistor devices in which a resistor material is applied to a first end of a fired, ceramic multi-electrode chip, such as by dipping the end in a resistor paste and firing the chip to form a resistor on the end of the chip. End terminations are then applied to both ends of the chip, such as by applying a conductor paste to the ends and firing the chip. By this method, a power resistor device is formed in which buried continuous conductor electrodes are electrically connected to the end terminations, where the connection at the first end is through the resistor material to form a resistor device structured to efficiently dissipate heat generated by the resistor. In an alternative method of the present invention, a resistor material is applied to both ends of the chip, such as by dipping both ends in the resistor paste, to form resistors on both ends of the chip. The end terminations are then formed over the resistors, such as by applying conductor paste over the resistors and firing the chip. By this alternative method, a power resistor device is formed in which the buried conductor electrodes are electrically connected to the end terminations, where the connection at both ends is through the resistor material to form a resistor device structured to efficiently dissipate heat. In yet another alternative method of the present invention, a conductor underlayer is formed under the resistor, such as by first dipping the end of the chip in a conductor paste and firing the chip. By this alternative method, a power resistor device is formed in which the buried conductor electrodes are electrically connected to the end terminations through the conductor underlayers and resistors.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

DETAILED DESCRIPTION

There is provided a power resistor device having a high power rating and a simple method for making the device that is an enhancement of the LTCC approach. In its simplest form, the method of the present invention includes providing an unterminated ceramic chip with internal conductor electrodes and forming a resistor on the end of the chip, followed by terminating the ends of the chip. The present invention has the advantage that any ceramic chip made by any known, existing process can be converted into a power resistor device. Thus, the method of the present invention for making a power resistor device begins with the fired ceramic multi-electrode chip before any other materials have been added. The electrode or conductor plates extend through the ceramic body to both ends. In one embodiment, a resistor paste, such as those sold by Heraeus, DuPont or Ferro, is loaded into an automatic end-termination machine, such as one sold by ESI Chipstar, and then the chip is dipped at one end into the resistor paste, and the resistor paste is fired onto the chip. End termination material, such as silver, is loaded into the same or similar dipping machine, and standard end terminations are formed on both ends of the chip. The end termination material is then fired, thereby forming the power resistor device. This device is then mounted onto the circuit board by solder connections to the end terminations. In use, heat is generated by the resistor, which is mostly dissipated through the end terminations and solder. By structuring the device to efficiently dissipate the heat through metal, a high power rating is achieved.

In addition to dipping resistor and conductor paste onto the ends of the chip, the materials could be sputtered onto the ends. Also, the resistors may be formed by laminating a green tape of resistor material onto the end, followed by firing the chip. Thus, while the dipping technique is described in exemplary embodiments of the present invention, it should be understood that other techniques now known or hereafter developed may be used to form the resistors and/or end terminations.

The method and device of the present invention may be further described in reference to FIGS. 1–6, in which like numerals are used to refer to like components.

Figure 1A:
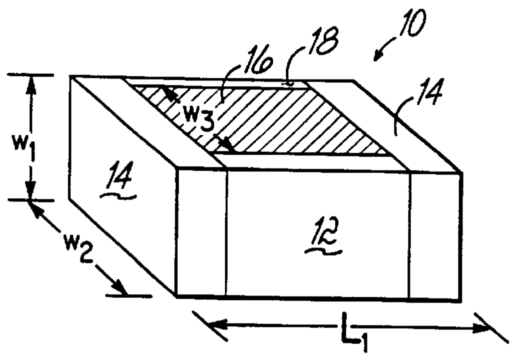
FIG. 1A PRIOR ART
FIGS. 1A and 1B are perspective and cross-sectional views, respectively, of a resistor device of the prior art.
Figure 1B:
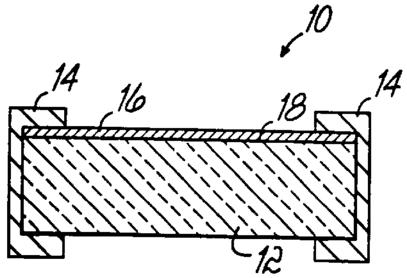
FIG. 1B PRIOR ART

FIGS. 1A and 1B depict in perspective view and cross-sectional view, respectively, a resistor device 10 of the prior art having a ceramic body 12 and end terminations 14. A resistor 16 is formed on a top surface 18 of ceramic body 12 and is in contact with end terminations 14 to form the resistor circuit. Resistor 16 is formed by printing resistor paste onto ceramic body 12, firing it, then dipping the ends of the chip into termination paste. As discussed above, heat generated by resistor 16 dissipates mainly into the air and into ceramic body 12, with little dissipation by the end terminations 14. Because device 10 is not structured to efficiently dissipate heat, it is not effective as a power resistor.

Figure 2:
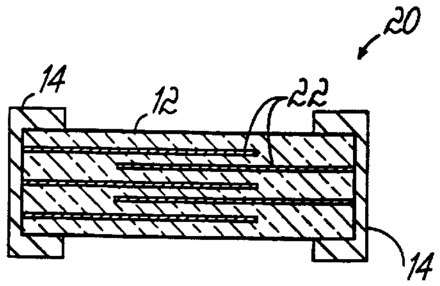
FIG. 2 PRIOR ART
FIG. 2 is a cross-sectional view of a capacitor device of the prior art.

FIG. 2 depicts a prior art capacitor device 20 that includes a fired, ceramic body 12 and end terminations 14 on opposing ends of the capacitor body 12. Fired, ceramic body 12 includes multiple buried capacitor electrodes 22 for electrically connecting to the end termination is 14, thereby forming the capacitor circuit. In the present invention, the capacitor plates 22 are replaced with continuous conductor electrodes 24, i.e., metal plates that extend to both ends of the chip, as shown in FIGS. 3A–3B and 5A–5B. Thus, the capacitor circuit is eliminated, and the conductor electrodes 24 act to short out the resistor device.

Figure 3A:
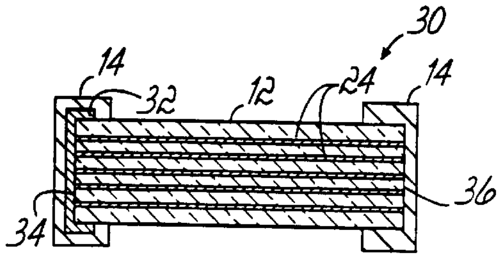
FIGS. 3A–3B are cross-sectional views of exemplary embodiments of a power resistor device of the present invention.
Figure 3B:
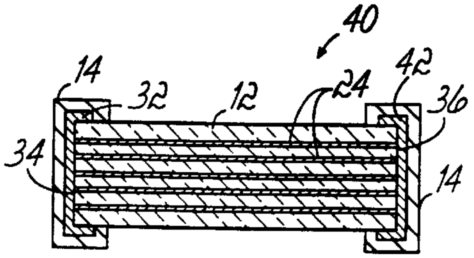

FIGS. 3A and 3B are cross-sectional views of exemplary embodiments of power resistor devices of the present invention. FIG. 3A depicts a high power resistor device 30 having ceramic body 12 with buried conductor electrodes 24. A resistor 32 is formed on a first end 34 of ceramic body 12, for example, by dipping end 34 into resistor paste and firing the paste. End terminations 14 are then formed on the first end 34 and the opposing second end 36 of ceramic body 12, for example, by dipping the first and second ends in conductor paste and firing the paste. In this arrangement, the buried conductor electrodes 24 are electrically connected to the end terminations 14, with one of those connections being through resistor 32 to form the high power resistor in which heat is efficiently dissipated through end terminations 14.

FIG. 3B depicts an alternative power resistor device 40 including ceramic body 12 with buried conductor electrodes 24. Resistor 32 is formed on the first end 34 of ceramic body 12, as described with respect to FIG. 3A. Another resistor 42 is formed on the second end 36 of ceramic body 12 in the same manner as resistor 32 was formed. End terminations 14 are then formed over resistors 32 and 42, such as by dipping the first and second ends 34, 36, respectively, into conductor paste and firing the paste. In device 40, the buried conductor electrodes 24 are electrically connected to the end terminations 14 through the resistors 32, 42 to form the high power resistor in which heat is efficiently dissipated through end terminations 14.

Figure 3C:
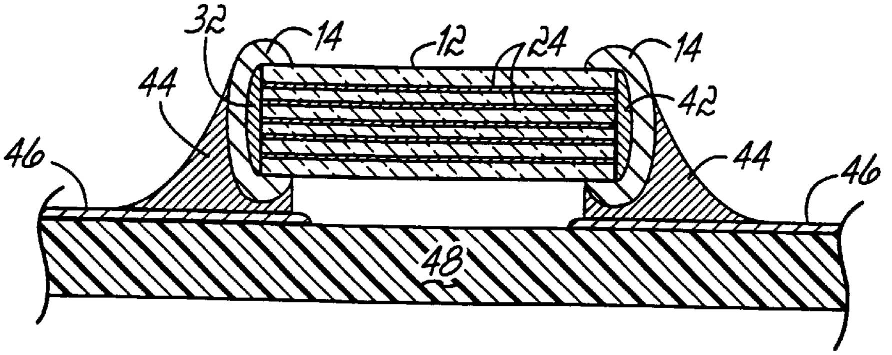
FIG. 3C is a cross-sectional view of the device of FIG. 3B mounted on a circuit board.

An advantage of the resistors 30 and 40 in FIGS. 3A and 3B is that the heat dissipation of the resistors is superior to the dissipation of a conventional resistor as in FIGS. 1A and 1B. This is due to the resistors 32, 42 being covered completely by the metal end terminations 14, which are then connected, as shown in FIG. 3C, by solder 44 to metal traces 46 on the circuit board substrate 48, whereby the heat conductivity is very high. Heat is mostly dissipated through end terminations 14 and solder 44, with little dissipation through ceramic body 12. In device 10 of FIGS. 1A and 1B, the resistor 16 sits on the top surface 18 of ceramic body 12, such that heat is either radiated to the air or conducted through the ceramic body 12, both of which are less efficient as compared to devices 30 and 40. Thus, the resistors 32, 42 of devices 30, 40 of the present invention will have a higher power rating than device 20, which is a commonly specified attribute for chip resistors.

Figure 3D:
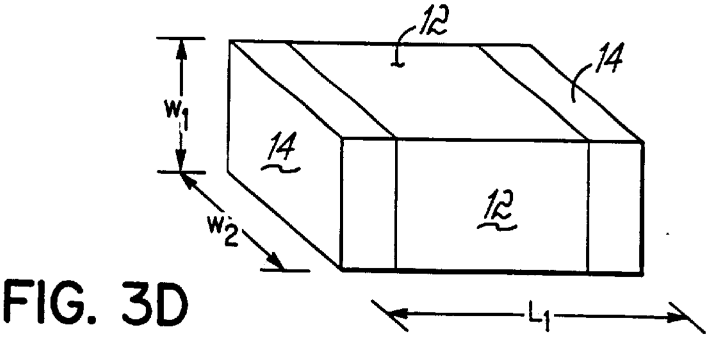
FIG. 3D is a perspective view of the devices of FIGS. 3A–3B.

A perspective view of resistor device 40 is provided in FIG. 3D to further explain the increased power capability of devices of the present invention. For an 0402 device in which length $L_1$, is 40 mil. and the ends of the chip have an area $W_1 \times W_2$ of 20 mil.×20 mil., the resistor occupies an area of 400 sq. mil. at each end of the chip 40, for a total of 800 sq. mil. The conduction of heat from the 800 sq. mil. of resistor is through the metal end terminations 14, which are 100% in contact with the resistors, to the substrate 48 of the circuit board. In the prior art device 10 depicted in FIG. 1A, the printed resistor 16 is generally formed to a width $W_3$ of about 10 mil., leaving a 5 mil. strip on either side of the resistor 16. For a 40 mil. length L, the resistor covers an area of 40×10, thereby equaling 400 sq. mil. Because the resistor 16 is exposed, some of the heat dissipation is through the air, and heat conduction is mostly through the alumina to the end terminations 14 and some conduction through the resistor contact to the end termination 14. Thus, device 40 of the present invention is structured to efficiently dissipate heat through the end terminations 14, and device 10 of the prior art is not. The increase in power rating for devices of the present invention is expected to be at least approximately 4 times the power rating of the prior art device. Thus, for an 0402 device, a prior art resistor device 10 might achieve a maximum power of 50 mW at a maximum voltage of 30 volts, whereas a power resistor of the present invention could achieve 200 mW or greater at the same voltage. Thus, the higher power rating is achieved without increasing the size of the device, thereby also enabling higher density circuit boards.

Figure 3E:
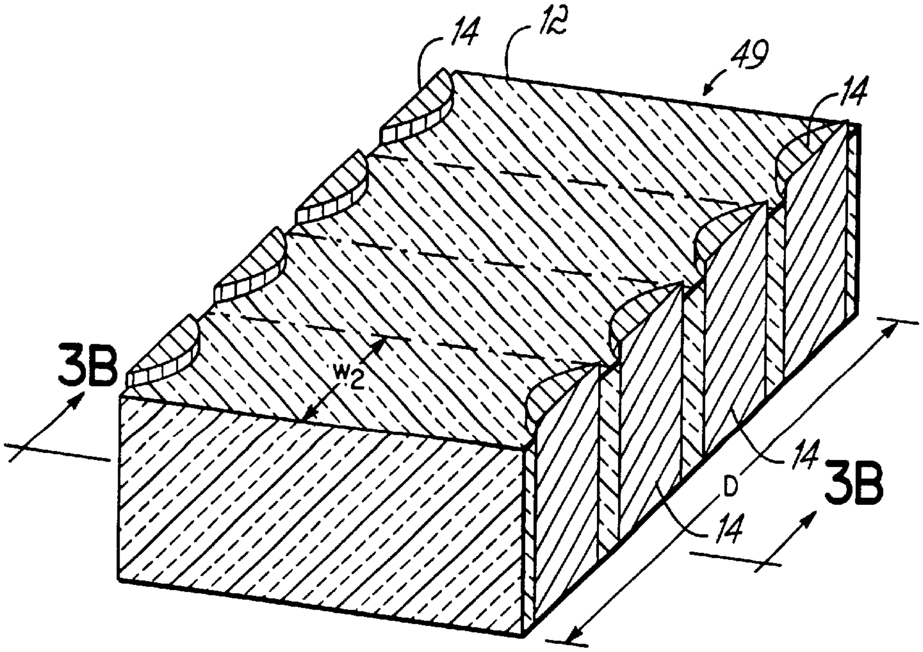
FIG. 3E is an embodiment of a multi-device array of the present invention.

A multi-device array 49 may also be formed, as depicted in FIG. 3E. Ceramic body 12 has a dimension D such that it can later be diced into individual high power resistor devices of width $W_2$, as indicated by the dotted lines. The resistors 32, 42 and end terminations 14 are formed, for example, by a striping machine, which may also be obtained from ESI Chipstar, that applies the materials in vertical stripes along the dimension D and perpendicular thereto, on both sides of the array 49. A stripe is applied for each device 40 to be diced from the array 49, which would be four resistor devices 40 in the specific embodiment depicted in FIG. 3E. A cross-section along line 3B reveals the same device 40 as depicted in FIG. 3B, having a resistor 32, 42 at each end. However, only one resistor 32 could be formed, as with device 30 in FIG. 3A, by applying the resistor material stripes along the dimension D on only one side of the array 49.

Figure 4:
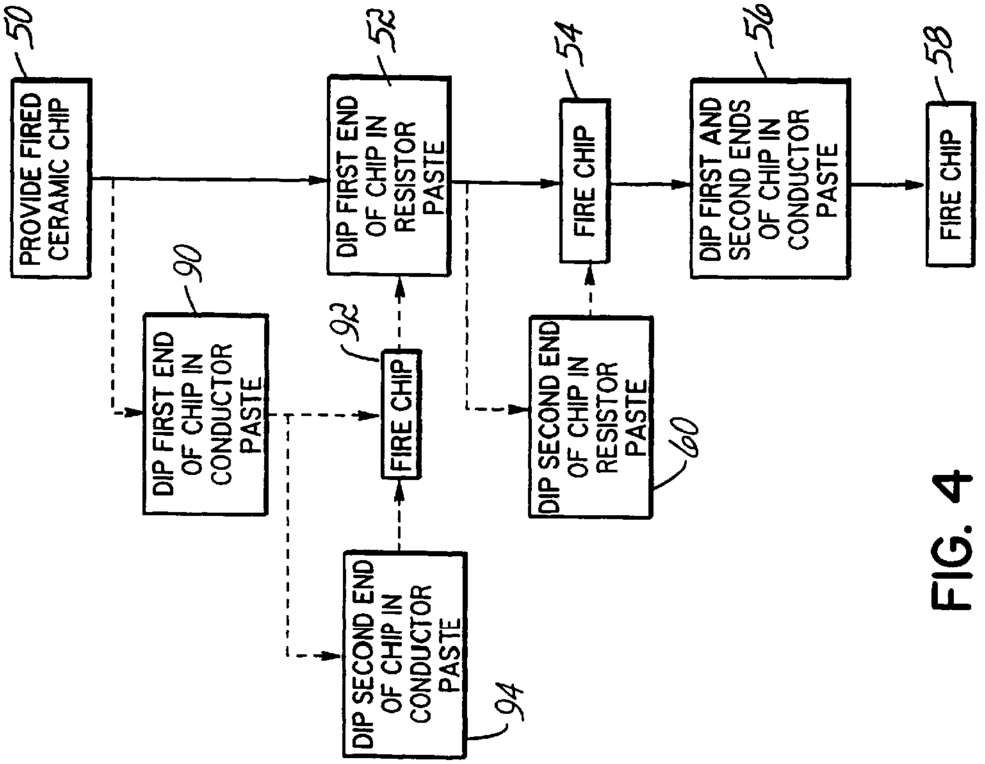
FIG. 4 is a flow chart for a method of the present invention.

FIG. 4 provides a flow diagram for a method of manufacturing the power resistor devices 30 and 40 of FIGS. 3A and 3B, respectively, using the dipping method for applying materials. In step 50, a fired, ceramic chip 12 is provided, having multiple buried conductor electrodes 24. In prior LTCC methods, the ceramics had to be custom developed to work with the overall LTCC system, and it was difficult to get dielectric constant (K) values using that approach. In the method of the present invention, any existing ceramic chip may be used as prepared by any existing process. So, the method of the present invention begins in step 50 with a fired ceramic multi-layer chip 12, before any other materials have been added.

In step 52, the first end 34 of the ceramic chip 12 is dipped in resistor paste. The resistor paste has been previously loaded into an automatic end termination machine, such as an ESI Chipstar machine. Thus, the resistor paste is applied using apparatus already needed for forming the end terminations, thereby minimizing expense and equipment for converting the ceramic chip 12 to a high power resistor device. In step 54, the chip is fired to form the resistor 32. In step 56, the first end 34 having resistor 32 thereon and the second end 36 of body 12 are each dipped in conductor paste. The conductor paste has been previously loaded into an automatic end termination machine, and advantageously the same machine used for applying the resistor paste. In step 58, the chip is again fired to form the end terminations 14. In an alternative method, for example to make device 40 of FIG. 3B, an optional step 60, depicted with phantom lines, is carried out after step 52 wherein the second end 36 of ceramic body 12 is dipped in resistor paste. Step 54 is then carried out in which the chip is fired to form resistors 32 and 42.

Figure 5A:
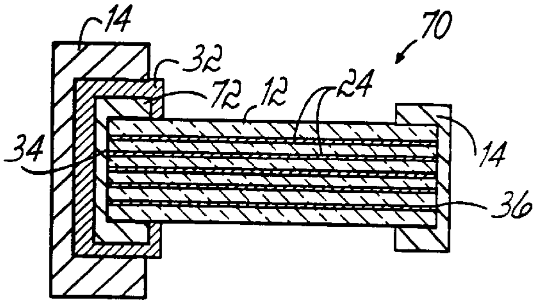
FIGS. 5A–5B are cross-sectional views of alternative embodiments of power resistor devices of the present invention.
Figure 5B:
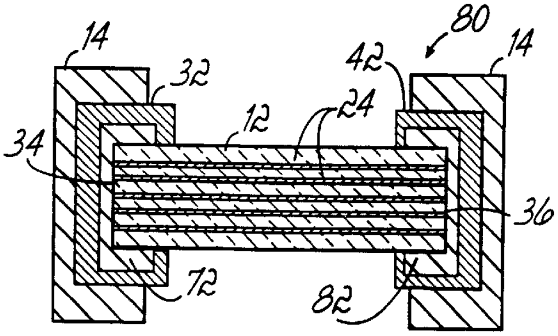

FIGS. 5A and 5B depict alternative embodiments of the present invention. In FIG. 5A, a power resistor device 70 is depicted having a ceramic body 12 with buried conductor electrodes 24. A conductor under-layer 72 is formed on the first end 34 of ceramic body 12, such as by dipping end 34 into a conductor paste loaded in the end-termination machine and then firing the chip. Resistor 32 is then formed over conductor under-layer 72, as described in the above figures. End terminations 14 are then formed, as described above. As is shown in FIG. 5A, end termination 14 need not completely encapsulate resistor 32. However, resistor 32 should separate conductor under-layer 72 and end termination 14 such that the two conductor portions 72, 14 cannot short together, but must connect through the resistor 32. By this arrangement, the buried conductor electrodes 24 are electrically connected to the end terminations 14 with the connection at the first end 34 being through conductor under-layer 72 and resistor 32 to thereby form the high power resistor. Dipping the conductor paste as an under-layer provides a larger area than just the buried electrodes such that the effective resistance from a given resistor paste is different, and advantageously lower.

FIG. 5B depicts an alternative power resistor device 80 having ceramic body 12 with buried conductor electrodes 24. Conductor under-layer 72 is formed on first end 34 of ceramic body 12 as described with reference to FIG. 5A and a conductor under-layer 82 is formed on the second end 36 of ceramic body 12 in the same manner. Resistors 32 and 42 are then formed over respective conductor under-layers 72 and 82. End terminations 14 are then formed over resistors 32 and 42. By this arrangement, the buried conductor electrodes 24 are electrically connected to the end terminations 14 through conductor under-layers 72, 82 and resistors 32, 42 to form the high power resistor. Devices 70 and 80 may also be fabricated as an array as described above with reference to FIG. 3E.

FIG. 4 further depicts with phantom lines an alternative method for fabricating device 70 of FIG. 5A. Prior to step 52, step 90 is carried out in which first end 34 is dipped in conductor paste, and then step 92 comprises firing the chip to form conductor under-layer 72. Steps 52, 54, 56 and 58 are then carried out to form the resistor 32 and end terminations 14. FIG. 5B may be made by alternative method also depicted in FIG. 4 in which second end 36 is dipped in conductor paste in a step 94 preceding step 92. Step 92 is then carried out to form conductor under-layers 72 and 82. Steps 52, 60, 54, 56 and 58 are then carried out to form resistors 32, 42 and end terminations 14.

Figure 6:
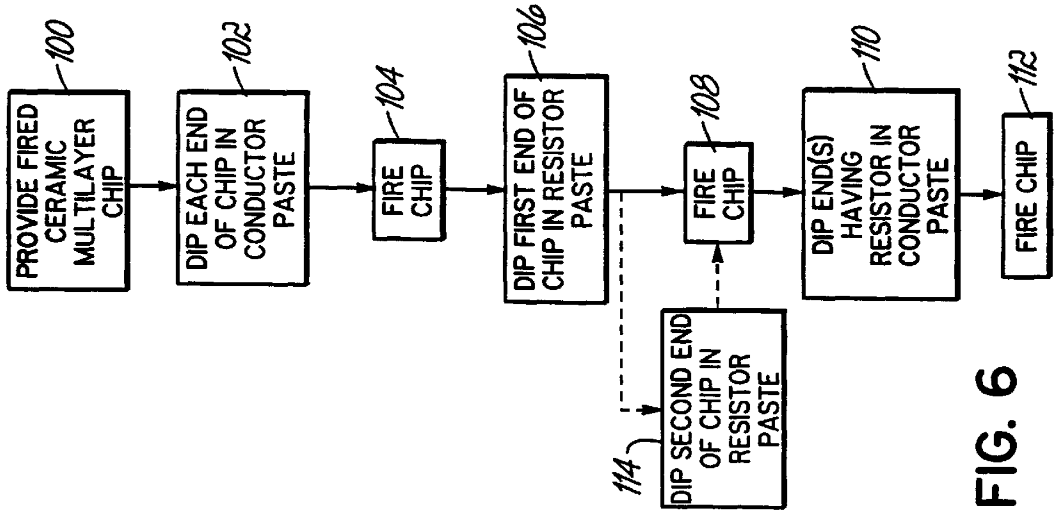
FIG. 6 is a flow chart of an alternative method of the present invention.

FIG. 6 provides an alternative method for fabricating the device 70 of FIG. 5A, also using the dipping method. Step 100 provides a fired, ceramic chip, as in step 50. Each end 34, 36 is then dipped in conductor paste in step 102. In step 104, the chip is fired to form conductor under-layer 72 on first end 34 and end termination 14 on second end 36. In step 106, first end 34, having under-layer 72 thereon, is then dipped in resistor paste, followed by firing the chip in step 108 to form resistor 32. First end 34 is then dipped in conductor paste in step 110, followed by firing the chip in step 112 to form the other end termination 14 on the first end 34. In the alternative method depicted in FIG. 6 for forming device 80 of FIG. 5B, additional step 114 is provided prior to firing step 108 in which the second end 36 is dipped in resistor paste, followed by step 108 to form resistors 32 and 42. Both ends 34, 36 are then dipped in conductor paste in step 110 to form end terminations 14. Thus, step 102 formed conductor under-layers 72 and 82. This alternative method is essentially the same as the method depicted in FIG. 4 in which optional steps 90, 94, 92 and 60 are included. Thus, any order of dipping and firing may be carried out to form the devices of FIGS. 3A, 3B, 5A and 5B.

In each of the methods of the present invention set forth in the flow charts of FIGS. 4 and 6, firing the resistor paste onto the chip may be carried out at about 850° C. for approximately 10 minutes. Firing the conductor pastes to form the conductor under-layers and end terminations may include firing at about 600° C. to about 800° C. for about 5–10 minutes.

Conductor materials are inks, also called pastes, that are commonly made using precious metal powders, such as silver, palladium, gold and platinum. Any alloy of these precious metals is functional as a conductor material, and they are chosen based on the process requirements: firing temperature stability in the ceramic, cost and the like. For example, silver is a standard end termination material that fires at temperatures in the range of about 500–900° C., for example about 600–800° C. Conductor pastes generally have resistivity values of 0.001–0.003 ohms per square. The conductor materials may be applied to the chip by dipping or sputtering, for example.

Resistor pastes are commonly made using ruthenium oxide as a main constituent, and glass the other constituent. To make a resistivity paste, very little ruthenium oxide is used. To make a low resistivity paste, a percentage of ruthenium oxide is used. Resistor pastes are commercially available from such sources as DuPont, Heraeus, or Ferro corporations. Resistor pastes generally come in values of 1–1,000,000 ohms per square (for example 10, 100, 1,000, 10,000 . . . ). The term "ohms per square" refers to the resistance exhibited from a standard thickness of material. Heraeus, for example, is capable of making resistor paste of any value from 0.1 ohms per square to 1 Megohm per square. By way of example, on an 0402 (0.04 inch long and 0.020 inch×0.020 inch end) capacitor, a 10 ohm paste gives approximately 10 ohms of final resistance. The correlation factor (resistance value of paste versus obtained value on the chip) will vary depending on the size of the end of the chip and the number of buried electrode plates. For power resistors, a resistance of 10 ohms or less is typical, and advantageously is 1–10 ohms, due to the high amount of heat generated by lower resistance devices, which can then be efficiently dissipated. The resistance desired by the customer may be obtained by varying the resistivity of the paste. Another method for varying the resistance value is to change the firing temperature of the resistor paste. By firing hotter or cooler than the typical firing temperature of 850° C., it is possible to increase or decrease the resistivity of the material because the density of the fired film changes with temperature, thus changing the actual resistance. For example, the resistor paste may be fired at temperatures in the range of about 500–900° C., for example about 800–900° C. The resistance may also be changed by adding conductor under-layers 72 and/or 82, as described above with respect to FIGS. 5A and 5B. The resistor material may be applied by dipping or sputtering, for example, or in green tape form by lamination.

In FIGS. 3A and 5A, a resistor is formed on only one end of the chip. In FIGS. 3B and 5B, resistors are formed on both ends of the chip. While forming resistors on both end of the chip does not appear to provide additional resistor performance over the basic design, it does offer symmetry of performance, regardless of mounting direction.

While the present invention has been illustrated by the description of embodiments thereof, and while the embodiments have been described in considerable detail, they are not intended to restrict or in any way limit the scope of the appended claims to such detail. Additional advantages and modifications will readily appear to those skilled in the art. For example, by completely covering the resistors with the end terminations, better power dissipation can be achieved and thus a higher power rating. The invention in its broader aspects is therefore not limited to the specific details, representative apparatus and method and illustrative examples shown and described. Accordingly, departures may be made from such details without departing from the scope or spirit of applicant's general inventive concept.

What is claimed is:

1. A method for making a power resistor device comprising:

providing a fired, ceramic chip having opposing first and second ends and buried conductor electrodes extending to the first and second ends;

forming a first resistor by applying a resistor material to the first end of the chip; and forming a first and second end termination by applying a conductor material to the first resistor and to the second end of the chip, whereby the buried conductor electrodes are electrically connected to the first and second end terminations, the connection to the first end termination being through the first resistor to form the power resistor device.

2. The method of claim 1 further comprising forming a second resistor by applying a resistor material to the second end of the chip, and wherein forming the second end termination includes applying the conductor material to the second resistor, the connection to the second end termination being through the second resistor.

3. The method of claim 2 wherein forming the first and second end terminations includes applying the conductor material to completely cover the respective first and second resistors.

4. The method of claim 2 further comprising forming a first and second conductor under-layer by applying the conductor material to the first and second ends of the chip before forming the first and second resistors.

5. The method of claim 1 further comprising forming a first conductor under-layer by applying the conductor material to the first end of the chip before forming the first resistor.

6. The method of claim 1 wherein applying the resistor material includes dipping the end of the chip in the material and firing the chip and material to a temperature of about 500–900° C.

7. The method of claim 6 wherein firing the chip and material includes heating to a temperature of about 850° C.

8. The method of claim 1 wherein applying the conductor material includes dipping the end of the chip in the material and firing the chip and material to a temperature of about 500–900° C.

9. The method of claim 1 wherein applying the resistor material includes sputtering the material onto the end of the chip.

10. The method of claim 1 wherein applying the conductor material includes sputtering the material onto the end of the chip.

11. The method of claim 1 wherein applying the resistor material includes laminating the material in green tape form onto the end of the chip and firing the chip and material to a temperature of about 500–900° C.

12. The method of claim 1 wherein the resistor material has a resistivity sufficient to produce less than about 10 ohms of resistance on the chip.

13. The method of claim 1 wherein the resistor material has a resistivity sufficient to produce about 1 to about 10 ohms of resistance on the chip.

14. The method of claim 1 wherein forming the first end termination includes applying the conductor material to completely cover the first resistor.

15. A method for making a power resistor device comprising:

providing a fired, ceramic chip having opposing first and second ends and buried conductor electrodes extending to the first and second ends;

forming a first resistor by applying a resistor paste to the first end of the chip and firing the resistor paste; and forming the first and second end terminations by applying a conductor paste to the first resistor and to the second end of the chip and firing the conductor paste, whereby the buried conductor electrodes are electrically connected to the first and second end terminations, the connection to the first end termination being through the first resistor to form the power resistor device.

16. The method of claim 15 further comprising forming a second resistor by applying a resistor paste to the second end of the chip and firing the resistor paste, and wherein forming the second end termination includes applying the conductor paste to the second resistor, the connection to the second end termination being through the second resistor.

17. The method of claim 16 wherein forming the first and second end terminations includes applying the conductor paste to completely cover the respective first and second resistors.

18. The method of claim 16 further comprising forming a first and second conductor under-layer by applying the conductor paste to the first and second ends of the chip before forming the first and second resistors, and firing the conductor paste.

19. The method of claim 15 further comprising forming a first conductor under-layer by applying the conductor paste to the first end of the chip before forming the first resistor, and firing the conductor paste.

20. The method of claim 15 wherein firing the resistor paste includes heating to a temperature of about 500–900° C.

21. The method of claim 20 wherein firing the resistor paste includes heating to a temperature of about 850° C.

22. The method of claim 15 wherein firing the conductor paste includes heating to a temperature of about 500–900° C.

23. The method of claim 15 wherein applying the resistor and conductor pastes includes dipping the respective end into the paste.

24. The method of claim 15 wherein the resistor paste has a resistivity sufficient to produce less than about 10 ohms of resistance on the chip.

25. The method of claim 15 wherein the resistor paste has a resistivity sufficient to produce about 1 to about 10 ohms of resistance on the chip.

26. The method of claim 15 wherein forming the first end termination includes applying the paste material to completely cover the first resistor.

27. A method for making a power resistor device comprising:

providing a fired, ceramic chip having opposing first and second ends and buried conductor electrodes extending to the first and second ends;

forming a first conductor under-layer by applying a conductor paste to the first end of the chip and firing the conductor paste;

forming a first resistor by applying a resistor paste to the first conductor under-layer and firing the resistor paste; and forming the first and second end terminations by applying a conductor paste to the first resistor and to the second end of the chip and firing the conductor paste, whereby the buried conductor electrodes are electrically connected to the first and second end terminations, the connection to the first end termination being through the first conductor under-layer and first resistor to form the power resistor device.

28. The method of claim 27 further comprising, before forming the second end termination:

forming a second conductor under-layer by applying a conductor paste to the second end of the chip and firing the conductor paste; and forming a second resistor by applying a resistor paste to the second conductor under-layer and firing the resistor paste, wherein forming the second end termination includes applying the conductor paste to the second resistor, the connection to the second end termination being through the second conductor under-layer and second resistor.

29. The method of claim 28 wherein forming the first and second end terminations includes applying the conductor paste to completely cover the respective first and second resistors.

30. The method of claim 27 wherein firing the resistor paste includes heating to a temperature of about 500–900° C.

31. The method of claim 30 wherein firing the resistor paste includes heating to a temperature of about 850° C.

32. The method of claim 27 wherein firing the conductor paste includes heating to a temperature of about 500–900° C.

33. The method of claim 27 wherein applying the resistor and conductor pastes includes dipping the respective end into the paste.

34. The method of claim 27 wherein the resistor paste has a resistivity sufficient to produce less than about 10 ohms of resistance on the chip.

35. The method of claim 27 wherein the resistor paste has a resistivity sufficient to produce about 1 to about 10 ohms of resistance on the chip.

36. The method of claim 27 wherein forming the first end termination includes applying the conductor paste to completely cover the first resistor.

37. A power resistor device comprising:

a fired, ceramic chip comprising buried conductor electrodes extending between opposing first and second ends;

a first resistor over the first end of the chip; and a first end termination over the first resistor and a second end termination over the second end of the chip, wherein the buried conductor electrodes are electrically connected to the first and second end terminations, the connection to the first end termination being through the first resistor to form the power resistor device.

38. The device of claim 37 further comprising a second resistor over the second end of the chip wherein the second end termination is over the second resistor, and the electrical connection to the second end termination is through the second resistor.

39. The device of claim 38 wherein the first and second end terminations completely cover the respective first and second resistors.

40. The device of claim 38 further comprising a first and second conductor under-layer between the respective first and second ends of the chip and the respective first and second resistors.

41. The device of claim 37 further comprising a first conductor under-layer between the first end of the chip and the first resistor.

42. The device of claim 37 wherein the resistor comprises a material having a resistivity sufficient to produce less than about 10 ohms of resistance on the chip.

43. The device of claim 37 wherein the resistor comprises a material having a resistivity sufficient to produce about 1 to about 10 ohms of resistance on the chip.

44. The device of claim 37 wherein the first end termination completely covers the first resistor.

* * * * *

UNITED STATES PATENT AND TRADEMARK OFFICE

CERTIFICATE OF CORRECTION

PATENT NO. : 6,690,558 B1
DATED : February 10, 2004
INVENTOR(S) : Alan Devoe and Daniel Devoe It is certified that error appears in the above-identified patent and that said Letters Patent is hereby corrected as shown below:

Column 3,
Line 51, "termination is 14" should be -- terminations 14 --.

Column 4,
Line 38, "length $L_1$, is" should be -- length $L_1$ is --.
Line 48, "length L, the" hould be -- length $L_1$, the --.

Signed and Sealed this

Sixth Day of July, 2004

JON W. DUDAS
*Acting Director of the United States Patent and Trademark Office*